Sept. 9, 1952  R. T. DOUGHTY  2,609,803
VALVE ROTATING DEVICE
Filed Dec. 24, 1949
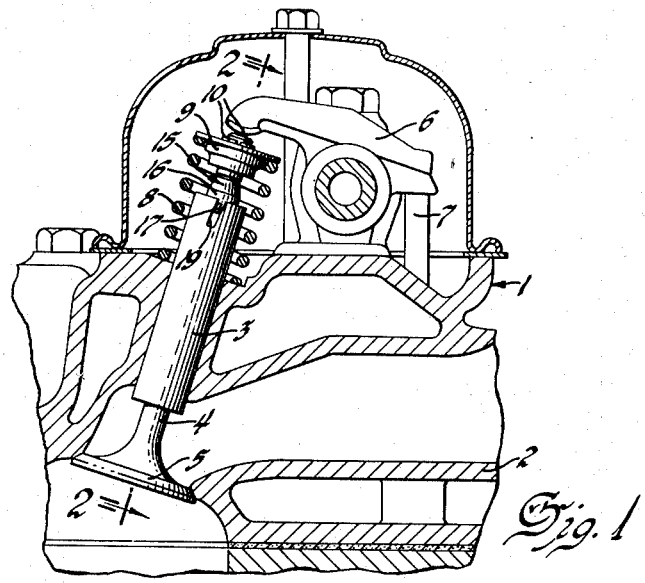
Fig. 1
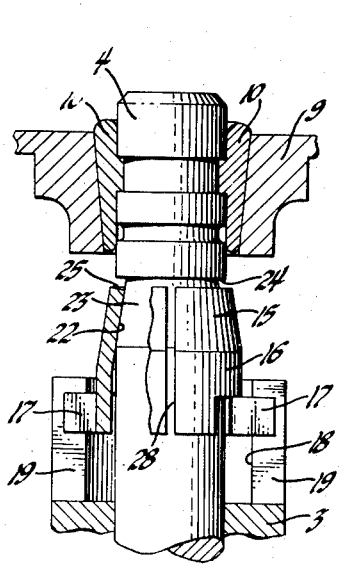
Fig. 2
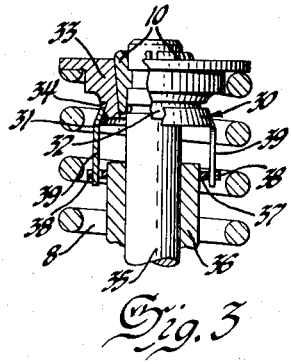
Fig. 3
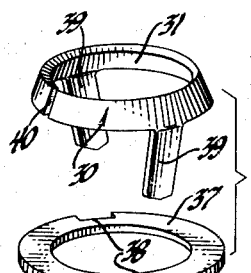
Fig. 4
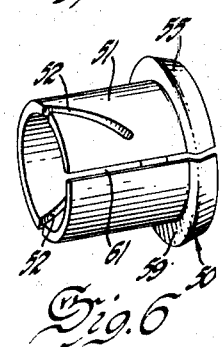
Fig. 5
Fig. 6
Inventor
Robert T. Doughty
By Willits, Helmig & Baillio
Attorneys Patented Sept. 9, 1952

2,609,803

UNITED STATES PATENT OFFICE 2,609,803

VALVE ROTATING DEVICE

Robert T. Doughty, Detroit, Mich., assignor to General Motors Corporation, Detroit, Mich., a corporation of Delaware Application December 24, 1949, Serial No. 134,897

9 Claims. (Cl. 123—90)

This invention relates to internal combustion engines and particularly to poppet valve rotating devices therefor.

It has been appreciated for some time in the art that rotation of the valves during engine operation tends to prevent excessive and uneven carbon deposits thereon with resultant valve sticking and pitting. While many devices for effecting such rotation have been previously proposed they have not won general acceptance principally because their constructions lacked simplicity of design and involved numerous parts with resultant excessive cost of manufacture and uncertainty of trouble-free operation. In the alternative, various expedients such as improvements in materials and cooling for the valves and valve seats have been employed to avoid or at least diminish the pitting and sticking problem. However, with the ever increasing power demands being made of internal combustion engines the need for valve rotation is continually being re-emphasized, and it is the principal object of my invention to satisfy this need with a device for the purpose which is peculiarly adapted for both low-cost manufacture and dependable performance.

This and other objects which will be apparent from a reading of the following description are accomplished by providing a generally annular ring member about the valve stem having a helical interengagement with the valve guide and an axially engageable clutch surface arranged to coact with a similar clutch surface on the valve stem or member carried therewith, said annular member having a limited longitudinal movement relative to the valve to permit engagement and disengagement of the clutch surface.

In the drawing:

Figure 1 is an elevational view of one form of my invention shown in its relation to the valve operating linkage of an internal combustion engine, a portion only of the engine being shown.

Figure 2 is a sectional view substantially on line 2—2 of Figure 1.

Figure 3 is a view similar to Figure 2 but showing a modified valve rotating device incorporating the principles of my invention.

Figure 4 is an enlarged perspective view of certain detailed parts of the valve rotating device shown in Figure 3.

Figure 5 is a view similar to Figure 3 but showing a further modified valve rotating device incorporating the principles of my invention.

Figure 6 is an enlarged perspective view of a part of the device shown in Figure 5.

Referring to Figures 1 and 2, there is shown a portion of a conventional overhead valve type internal combustion engine 1 including a cylinder head 2 in which is fixed a bushing 3 for guiding the stem 4 of a poppet valve 5. Suitable means for reciprocating the valve 5 include the rocker 6, push rod 7, a cam (not shown), and a compression spring 8 the opposite ends of which are retained by the cylinder head 2 and a washer 9 fixed by conventional split locks 10 to the valve stem 4. It will be understood that upward movement of the push rod in response to force transmitted thereto by the cam causes the rocker to rotate counterclockwise as viewed in Figure 1 and drive the valve stem downwardly in its guide, the spring yieldingly accommodating this movement of the parts and effecting their return to their initial positions shown as the cam completes its cycle of operation.

To effect rotation of the valve during the upward or valve-closing stroke of its reciprocatory movement I have added a member 15 which is carried longitudinally with the valve but has freedom for a small amount of lost motion longitudinally thereof during each change in direction of longitudinal movement of the valve. The member 15 is generally annular in shape with a cylindrical portion 16 loosely surrounding the valve stem and provided with one or more (preferably at least two) radially outward extending protuberances or arms 17. These arms 17 are conveniently formed integral with the cylindrical portion 16 as portions lanced out of and bent away from the cylindrical portion 16. The upper end of the valve guide bushing 3 is counterbored as at 18 to accommodate the reciprocal movement of the annular member 15 therein. The walls of the counterbore 18 are helically slotted as at 19 to slidably receive the arms 17 and cam the same rotatively about the axis of the valve stem, thereby producing an oscillatory movement of the member 15 as it reciprocates with the valve. The upper portion of the member 15 converges toward the valve stem to provide an inwardly tapered clutch surface 22, and the valve stem is provided oppositely thereof with a coacting inwardly tapered clutch surface 23 terminating upwardly in a shoulder 24. Shoulder 24 serves as an abutment for the upper end 25 of member 15 limiting upward movement of member 15 relative to the valve to an amount sufficient to effect disengagement of the clutch surfaces 22 and 23. During downward movement of member 15 relative to the valve the clutch surfaces engage, thereby rotatively locking the valve and member 15 together and limiting further longitudinal movement therebetween.

A slit 28 extending from end to end of the member 15 permits its necessary expansion during assembly and disassembly to pass over the shoulder 24 on the stem after the spring retainer washer 9 and split locks 10 are removed from the stem.

In operation, the inertia forces on the member 15 opposing both its rotation and its longitudinal movement with the valve, together with the frictional resistance to sliding movement of the arms 17 in the slots 19, cause the member 15 to shift longitudinally on the valve stem with each change in direction of longitudinal movement of the valve. Hence, when the valve starts moving downwardly from its position as shown toward valve open position and the member 15 lags behind until the shoulder 24 engages the end 25, following which the member then moves downwardly with the valve and rotates in a clockwise direction (as viewed in plan) about the valve stem by reason of the camming action of the slots 19 on the arms 17. The frictional resistance to the sliding movement of these arms in their slots provides an upward reactive force acting against the member 15 to maintain its end 25 in rotative abutting relation with the shoulder 24 and the clutch surfaces 22 and 23 out of engagement during the continued downward movement of the valve toward open position. Then upon the valve reaching its lowermost position and starting its upward movement to return to closed position, the member again lags behind until the clutch surface 23 on the stem moves into engagement with the clutch surface 22 on the member, following which the member moves upwardly with the valve and rotates counterclockwise by reason of the camming action of the slots 19 on the arms 17. The valve stem now being frictionally locked to the member the valve is also forced to rotate, sufficient slippage occurring between the lower end of the spring and the cylinder head or between the upper end of the spring and the retainer washer, or both, for this purpose. The frictional forces resisting the sliding movement of the arms 17 in the slots 19 provide a sufficient reactive force acting downwardly on the member to maintain the clutch surfaces 22 and 23 engaged during the continued upward movement of the valve toward closed position.

Figures 3 and 4 illustrate a modification of the invention in which the annular member 30 functions similarly to the previously described member 15, but differs therefrom in that its tapered internal clutch surface 31 coacts with a correspondingly tapered clutch surface 32 provided on the lower outer periphery of the valve spring retainer washer 33. Adjacent the upper end of the clutch surface 32 on the retainer washer is a shoulder 34 which serves as an abutment for the upper end of the member 30 in the same manner as described for the shoulder 24 in the device of Figures 1 and 2. Locating the clutch surface 32 on the retainer washer enables obtaining a larger mean diameter for this surface than can conveniently be provided on the valve stem 35, thereby reducing the torsional forces on the member 30 in operation and improving its general ruggedness to resist strain.

This modification also embodies a different arrangement from that of Figures 1 and 2 for effecting a helical interengagement between the annular member and the stationary guide 36. Instead of counterboring this guide, a ring 37 having one or more notches 38 in its outer periphery is fitted over the upper end of the guide and fixedly secured thereto as by welding or other means. Helically inclined arms 39 formed integral with and depending from the annular member 30 slidably engage the respective notches 38 to impart rotation to the member 30 as it is driven toward and away from the ring 37 with reciprocation of the valve. 40 is a longitudinal slit provided in the member 30 to permit its expansion for assembly and disassembly with the spring retainer washer 33.

Operation of this form of the invention is the same as that previously described for the device of Figures 1 and 2, differing only in that the force for rotating the valve is applied to the spring retainer washer rather than directly to the valve stem.

In Figures 5 and 6 a still further modification of the invention is illustrated which differs principally from that of Figures 3 and 4 in that the annular member 50 is provided with a cylindrical skirt portion 51 instead of the aforementioned depending helically inclined arms 39. This skirt portion has helical slots 52 into which fixed pins 53 project from the stationary guide 54. The upper portion 55 of member 50 is conically shaped to provide it with an internal clutch surface 56, equivalent to that designated 31 on annular member 30 previously described, which coacts with a correspondingly tapered clutch surface 57 on the periphery of the valve spring retainer washer 58. Instead of a shoulder being provided as at 34 in Figure 3 for limiting the upward travel of the annular member 50, the upper portion 55 is turned radially inward to provide it with a shoulder 59 opposite the bottom end face 60 of the washer 58, the inner extremity of this shoulder joining integrally with the upper end of the cylindrical skirt 51. A slot 61 extending the full length of annular member 50 is provided to accommodate its expansion sufficiently at assembly and disassembly to slip the upper portion 55 thereof over the lower end of the washer 58.

This last described modification while slightly more expensive to construct than that of Figures 3 and 4 has advantages thereover in that the annular member 50 is more resistant to torsinal strain when rotatively driving the valve during valve opening by reason of the stiffening effect obtained from the cylindrical shape of its skirt 51, and in that it has less frictional resistance to rotation relative to the valve during valve closing by reason of the larger area of bearing contact between its shoulder 59 and the bottom end face 60 of the washer 58.

The similarity of operation of this form to that of the devices of Figures 1–4 is believed sufficiently apparent that a further description is unwarranted.

I claim:

1. In an internal combustion engine having a poppet-type valve means including a valve stem and a valve spring retainer washer fixed to the stem, stationary guide means for the stem accommodating rotation and reciprocation of the valve means, a spring in abutment with the washer and biasing the valve means longitudinally of the guide means, and a valve operator engageable with the stem to move the valve means longitudinally against the biasing force of the spring, the combination therewith of a member for rotating the valve means during its longitudinal movement in one direction, said member having a lost motion connection with the valve means accommodating a predetermined longitudinal movement of the valve means relative to the member, said connection being formed in part by coacting conical clutch surfaces on the member and valve means effective when engaged both to limit longitudinal movement of the valve means in one direction relative to the member and to rotatively lock the valve means and member together, said clutch faces terminating at one of their corresponding ends with coacting abutments limiting longitudinal movement of the valve means in the opposite direction relative to the member, said member having also a helical interengagement with the guide means effective with their relative movement longitudinally of the guide means in either direction to both rotate the member and apply a reactive force thereto longitudinally of the valve means, said reactive force serving to hold the clutch surfaces in engagement during longitudinal movement of the valve means in the direction urged by the spring and to hold the clutch surfaces out of engagement during longitudinal movement of the valve means in the opposite direction by the valve operator.

2. In an internal combustion engine having a poppet valve means, a guide therefor, and means for axially reciprocating the valve means, the combination therewith of means for rotating the valve means during axial movements thereof in one direction, said rotating means comprising a member embracing the valve means and provided with an inturned conical clutch face terminating at one of its conical ends with an abutment, a conical clutch face on the valve means terminating at its corresponding conical end with an abutment cooperable respectively with the clutch face and abutment of the member in loosely retaining the member on the valve means for reciprocation therewith, said clutch faces when engaged being effective to rotatively lock the member and valve means together, said member being helically interengaged with the guide.

3. The combination with a valve means mounted for reciprocation to and from closed position and for rotation during reciprocation, means for reciprocating said valve means, and guide means for the valve means, of means for causing rotary movement of said valve means during reciprocation comprising a member having reciprocating movement with the valve means and a helical connection with the guide means whereby said member is caused to rotate alternately in opposite directions relative to the valve means during reciprocation, and coacting conically shaped clutch faces on the member and valve means for clutching said member to the valve means during rotary movement of said member in one direction, said clutch faces terminating at one of their corresponding ends in coacting abutments having a spaced-apart relation when said clutch faces are engaged, said member having a longitudinal slit permitting radial separation of said clutch faces during assembly and disassembly of the member and valve means.

4. In an internal combustion engine having a poppet valve having a stem, stationary guide means for the stem accommodating rotation and reciprocation of the valve, and means for reciprocating the valve, the combination therewith of means for rotating the valve during longitudinal movement of the stem in one direction including an annular member loosely surrounding the stem, said member being reciprocated by the stem through a lost motion connection therewith, said connection being formed in part by coacting clutch surfaces on the member and stem effective when engaged both to limit longitudinal movement of the member in one direction relative to the stem and to rotatively lock the stem and member together, said member having also a helical interengagement with the guide means effective during reciprocation of the member to effect rotation of and apply reactive forces to the member in alternately opposite directions, said reactive forces serving to shift the member relative to the stem through the range of relative movement provided for by said lost motion connection.

5. The combination with a valve having a stem mounted for reciprocation to and from closed position and for rotation during reciprocation, means connected to the stem for effecting said reciprocation and guide means for the stem, of means for causing rotary movement of the valve during reciprocation comprising a member having reciprocating movement with the valve and a helical connection with the guide means whereby said member is caused to rotate alternately in opposite directions relative to the valve during reciprocation, and means for clutching said member to the valve stem during rotary movement of the member in one direction.

6. In an internal combustion engine having a poppet valve having a stem with a valve return spring retaining washer fixed thereto, a guide for the stem, and means for reciprocating the valve including a spring acting against the washer to bias the valve closed, the combination therewith of means for rotating the valve during longitudinal movement of the stem in one direction including an annular member coaxial with and connected to the washer for reciprocation thereby, said connection to the washer accommodating a predetermined longitudinal movement of the valve relative to the member of lesser magnitude than the reciprocatory stroke of the valve, said connection including coacting clutch surfaces on the member and washer effective when engaged both to rotatively lock the member to the washer and to limit longitudinal movement of the valve in one direction relative to the member, said member being also helically geared to the guide whereby said member is caused to rotate in alternate directions during reciprocation and said clutch surfaces are brought into and out of engagement with each other in accordance with the direction of longitudinal movement of the valve relative to the member.

7. The combination with a valve means including a valve stem and a spring thrust receiving element fixed thereto, guide means for the stem accommodating reciprocation and rotation of the valve means and means for reciprocating the valve means including a spring in thrust transmitting relation with said element, of means for causing rotary movement of the valve means during reciprocation comprising a member having reciprocating movement with the valve means and a helical connection with the guide means whereby said member is caused to rotate alternately in opposite directions relative to the guide means during reciprocation, and means for clutching said member to said element during rotary movement of the member in one direction.

8. In an internal combustion engine having a poppet valve having a stem with a valve return spring retaining washer fixed thereto, a guide for the stem, and means for reciprocating the valve including a spring acting against the washer to bias the valve closed, the combination therewith of means for rotating the valve during longitudinal movement of the stem in one direction including a member having an annular portion embracing the washer and a plurality of helically inclined depending arms, cooperating tapered clutch surfaces on the inner periphery of the annular portion and the outer periphery of the washer, said clutch surface on the washer terminating upwardly with a shoulder in abutting relation with the upper end of the annular portion, and a ring fixedly secured to the guide having peripheral slots slidably receiving said arms.

9. In an internal combustion engine having a poppet valve having a stem with a valve return spring retaining washer fixed thereto, a guide for the stem, and means for reciprocating the valve including a spring acting against the washer to bias the valve closed, the combination therewith of means for rotating the valve during longitudinal movement of the stem in one direction including an annular member having an internally tapered upper portion and a cylindrical lower portion interconnected by a radially extending generally flat portion, an externally tapered surface on the washer opposite the inner surface of the upper portion terminating in an end face opposite the flat portion, said cylindrical portion having a plurality of helical slots in its side wall, and pins fixed to the guide and slidably engaging said slots.

ROBERT T. DOUGHTY.

REFERENCES CITED

The following references are of record in the file of this patent:

UNITED STATES PATENTS

| Number | Name | Date |
|---|---|---|
| 1,347,488 | Arnold | July 27, 1920 |
| 1,414,499 | Buck | May 2, 1922 |
| 1,520,273 | Anthony | Dec. 23, 1924 |
| 1,610,409 | Anthony | Dec. 14, 1926 |